Figure 1:
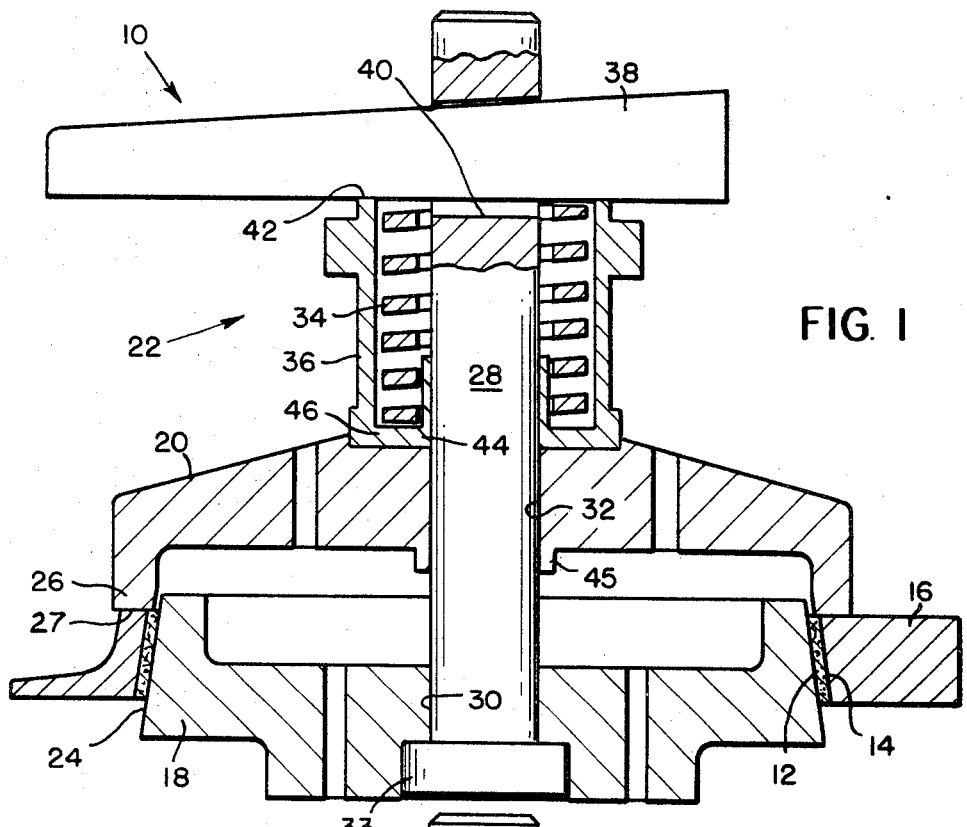

United States Patent [19]
Wise

[11] 3,751,796
[45] Aug. 14, 1973

[54] METHOD AND APPARATUS FOR BONDING AN ELEMENT TO A CONICAL SURFACE

[75] Inventor: Walter R. Wise, Pittsford, N.Y.

[73] Assignee: Garlock Inc., Palmyra, N.Y.

[22] Filed: May 26, 1972

[21] Appl. No.: 257,229

[52] U.S. Cl.................................. 29/559, 29/200 P
[51] Int. Cl......................... B23q 7/00, B23p 19/00
[58] Field of Search................... 29/400, 559, 200 P, 29/407, 400 D

[56] References Cited
UNITED STATES PATENTS

| | | | |
|---|---|---|---|
| 3,102,182 | 8/1963 | Oelze et al. | 156/583 X |
| 3,321,353 | 5/1967 | Zelnick | 156/499 |
| 3,512,240 | 5/1970 | Robinson | 29/200 B |

Primary Examiner—Thomas H. Eager
Attorney—John R. Schovee and Thomas R. Boston

[57] ABSTRACT

An installation fixture for use in holding, for bonding purposes, an annular, conical, liner against a conical surface of a member to which the liner is to be bonded, and for applying the same pressure each time regardless of variations in the thickness of the liner from one liner-member piece to the next. The fixture includes a stationary base having a conical receiving surface, (on either an inside or outside diameter surface), a movable cap and a spring arrangement for forcing the cap down on the member and liner with a predetermined repeatable pressure that is the same regardless of the thickness of the liner.

17 Claims, 2 Drawing Figures

PATENTED AUG 14 1973 3,751,796

METHOD AND APPARATUS FOR BONDING AN ELEMENT TO A CONICAL SURFACE

The invention relates to installation fixtures and more particularly to a fixture for bonding a liner to a conical surface.

It is an object of the present invention to bond a liner of friction material to a conical surface of a rigid core member while applying the same pressure each time regardless of variations in the thicknesss of the liner from piece to piece.

According to the present invention, the fixture includes: (1) a stationary base having a conical receiving surface on either the inside or outside diameter thereof adapted to mate with the liner to be bonded to a rigid member; (2) a cap movable relative to the base; and (3) means for pressing the cap down onto the layer and the member with the same constant repeatable, pressure from one liner-member piece to another regardless of variations in the thickness from one liner to another. The pressing means includes a compression spring, a stop means for limiting compression of the spring, a slotted guide post connected to the base and extending up through the cap, and a wedge for insertion into the slot to hold the spring compressed.

Figure 2:
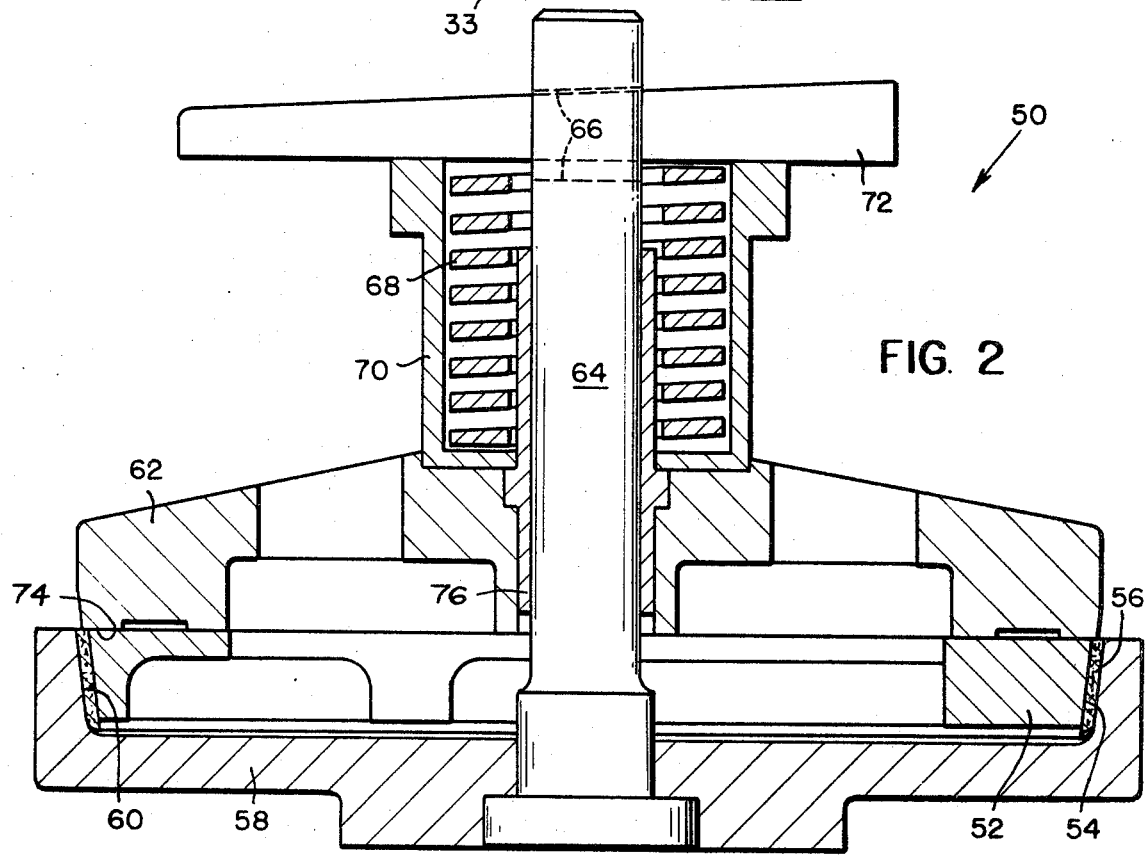

The present invention will be more fully understood by reference to the following detailed description thereof, when read in conjuction with the attached drawings, wherein like reference numerals refer to like elements, and wherein:

FIG. 1 is a cross-sectional side view of one embodiment of the present invention; and FIG. 2 is a cross-sectional side view of another embodiment of the present invention.

Referring now to the drawings, FIG. 1 shows a fixture 10 for use in bonding a liner 12 of material, such as a resinous friction material, to an inside diameter surface 14 of a rigid substrate or member 16, such as a transmission synchronizer plate.

The fixture 10 includes a stationary base 18, a movable cap 20, and means 22 for pressing the cap 20 down against the liner 12 and the member 16.

The base 18 includes a conical receiving surface 24 for mating with the liner 12. Throughout the present specification and claims, the phrase "mating" is hereby defined to mean that if the surface 14 to which the liner 12 is to be bonded is an inside diameter surface, then the mating receiving surface 24 is, as here, on an outside diameter surface, and vice versa, and also that the slope (for example, the angle the conical surface makes with the axis of the cone) of the two surfaces 14 and 24 are the same. The conical liner 12 mates with both surfaces 14 and 24. The axial length of the surface 24 is greater than the axial length of the surface 14 so as to accomodate various thicknesses of the liner 12.

The cap 20 includes an annular flange 26 having an engagement surface 27 for contacting the liner 12 and the member 16 and for pressing them down and for keeping the liner 12 from rising relative to the member 16. This downward force presses the liner 12 against the surface 14. The cap 20 is movably mounted with respect to the base 18 by means of a vertical coaxial, slotted guide post 28 press-fitted in an axial opening 30 in the base 18 and slip-fitted in an axial opening 32 in the cap 20. The lower end of the post 28 includes a flange 33 for preventing the post from being lifted up with reference to the base 18.

The means 22 for pressing the cap 20 downwardly includes a compression coil spring 34 located in a hollow cylindrical spring guard or housing 36 connected to the cap 20, and a wedge-shaped bar 38 for insertion through a chamfered slot 40 in the post 28 to hold the spring 34 down after it is compressed. A top edge 42 of the housing 36 forms a stop means for the spring 34. The housing 36 includes an inner cylindrical sleeve 44 connected to a lower wall 46 thereof, which sleeve 44 cooperates with a cylindrical extension 45 of the cap 20 in guiding the housing 36 and the cap 20 during sliding movement thereof on and off of the post 28. The sleeve 44 and the opening 32 are close fitting to the post 28 to maintain the engagement surface 27 normal to the guide post 28.

In operation, the cap 20, the housing 36 and the spring 34 are lifted up off of the post 28; the liner 12 is pressed into contact with the surface 14 of the member 16; and the liner-member piece is placed onto the receiving surface 24 of the base 18. The cap 20, the housing 36 and the spring 34 are then slid back down on the post 28 with the engaging surface 27 coming down on top of the member 16 and partially on top of the liner 12. There is sufficient clearance between the flange 26 and the surface 24 to prevent contact and binding therebetween. The spring 34 is then compressed by any suitable means, such as by a hudraulic piston in a press fixture, down to the edge 42, and then the wedge-shaped bar 38 is inserted into the slot 40 to hold the spring down. The compressing piston can then be removed. The fixture 10 and member 16 can then be placed in an oven for bonding the liner 12 to the surface 14. After bonding, the above operation is reversed to remove the liner-member piece from the fixture 10. An adhesive is employed between the liner 12 and the surface 14. The liner 12 is preferably cut from a flat sheet of material, in the proper shape so that when it is formed into a ring, it will have a conical shape matching that of the surface 14 to which it is to be bonded.

Regardless of variations in the thickness of the liner 12 from piece to piece, the same pressure is always applied between the liner 12 and the surface 14 during bonding, because the spring 34 is always compressed the same amount.

FIG. 2 shows another fixture 50 very similar to fixture 10 of FIG. 1, except that fixture 50 is for use with members 52 having an outside diameter surface 54 onto which a liner 56 is to be bonded. The fixture 50 includes a base 58 having a conical receiving surface 60, a cap 62, a slotted guide post 64 having a slot 66, a spring 68, a housing 70, and a wedge-shaped bar 72. A sleeve 76 is press-fitted in the cap 62 and is close fitting to the guide post 64 to maintain an engagement surface 74 of the cap 62 normal to the guide post 64. The sleeve prevents lateral and angular (tilting with respect to the axis) movement of the cap during its axial movement. While the sleeve 76 can be formed integral with the housing 70 and/or the cap 62, as shown in FIG. 1, it is preferred to have a separate sleeve 76 as shown in FIG. 2. The receiving surface 60 mates with the liner 56 covered surface 54 of the member 52. The operation of this embodiment is substantially the same as that described above for the fixture 10 of FIG. 1.

A fixture such as described above with respect to either or both of FIGS. 1 and 2, can alternatively be designed to operate on several liner-member pieces at one time.

The invention has been described in detail with particular reference to the preferred embodiment thereof, but it will be understood that variations and modifications can be effected within the spirit and scope of the invention as described hereinabove and as defined in the appended claims.

I claim:

1. An installation fixture for use in holding an annular, conical liner to a mating conical surface of a member comprising:
   a. a base having a conical surface adapted to mate with said conical surface of said member;
   b. a cap;
   c. means for supporting said cap for axial movement relative to said base;
   d. said cap including means for contacting a liner and a member placed adjacent said conical surface of said base; and
   e. means for forcing said cap downwardly against a liner and a member placed adjacent said conical surface of said base with a predetermined constant repeatable pressure regardless of variations in the thickness of said liner from one liner-member piece to another.

2. The apparatus according to claim 1 wherein said forcing means includes a compression spring mounted on said cap.

3. The apparatus according to claim 2 wherein said compression spring is mounted at a lower end thereof on said cap and including means for maintaining said spring compressed a predetermined constant amount regardless of the distance between said cap and base, whereby said cap applies the same pressure to a liner and member adjacent said base regardless of the thickness of said liner.

4. The apparatus according to claim 3 wherein said compressing means includes a stop means connected to said cap and positioned adjacent said spring for preventing said spring from being compressed past said stop means, a slotted guide post connected to said base and extending up through said cap and having a slot therethrough adjacent said stop means, and a wedge-shaped bar for insertion through said slot for maintaining said spring in a compressed condition extending only up to said stop means.

5. The apparatus according to claim 4 wherein said post is coaxial with and is press-fitted to said base and slip-fitted to said cap, and wherein said spring is a coil spring encircling said post.

6. The apparatus according to claim 5 including a hollow cylindrical elongated, coaxial sleeve connected to said cap and close fitting on said guide post for maintaining a liner-member engaging surface of said cap normal to said guide post.

7. The apparatus according to claim 5 wherein said conical surface on said base is on an outside diameter surface thereof.

8. The apparatus according to claim 5 wherein said conical surface on said base is on an inside diameter surface thereof.

9. The apparatus according to claim 1 wherein said conical surface on said base is on an outside diameter surface thereof.

10. The apparatus according to claim 1 wherein said conical surface on said base is on an inside diameter surface thereof.

11. A method for holding an annular, conical liner against a mating conical surface of a member comprising:
   a. providing a base with a conical surface adapted to mate with a conical surface of said member;
   b. placing said member and a liner to be bonded to said conical surface of said member in said base with said liner in contact with said conical surface of said base; and
   c. forcing said liner and said member toward said base surface with a predetermined constant repeatable pressure regardless of variations in the thickness of said liner from one liner-member piece to another.

12. The method according to claim 11 wherein said forcing step includes placing a cap on top of said liner and member and forcing said cap axially downwardly with a constant predetermined repeatable pressure.

13. The method according to claim 12 wherein said forcing step comprises placing a compression spring on top of said cap and compressing it a predetermined amount.

14. The method according to claim 13 wherein said compressing step comprises providing stop means preventing compression of said spring beyond said stop means, providing a slotted guide post connected to said base and extending up through said cap and having a slot therethrough adjacent said stop means, compressing said spring to said stop mens, and inserting a wedge-shaped bar into said slot to maintain said spring compressed to said stop means.

15. The method according to claim 13 including guiding said cap against lateral and angular movement during its axial movement toward and away from said base.

16. The method according to claim 15 wherein said base providing means comprises providing said conical surface on an outside diameter surface of said base.

17. The method according to claim 15 wherein said base providing means comprises providing said conical surface on an inside diameter surface of said base.

* * * * *

UNITED STATES PATENT OFFICE
CERTIFICATE OF CORRECTION

PATENT NO. : 3,751,796
DATED : August 14, 1973
INVENTOR(S) : Walter R. Wise

It is certified that error appears in the above-identified patent and that said Letters Patent are hereby corrected as shown below:

In claim 16, line 2, delete "means" and substitute therefor --step--.

In claim 17, line 2, delete "means" and substitute therefor --step--.

Signed and Sealed this seventh Day of October 1975

[SEAL]

Attest:

RUTH C. MASON
Attesting Officer

C. MARSHALL DANN
Commissioner of Patents and Trademarks